United States Patent [19]
Brahami et al.

[11] Patent Number: 5,991,404
[45] Date of Patent: Nov. 23, 1999

[54] SYSTEM FOR DIVERSIFYING INFORMATION IN A NETWORK FOR DISTRIBUTING GOODS OR SERVICES

[75] Inventors: Lionel Brahami, Montrouge; Nathalie Ocquet, Pierre Poli; Christian Dietrich, Charenton, all of France; Ly Thanh Phan, Austin, Tex.

[73] Assignee: Schlumberger Industries, S.A., Tokyo, Japan

[21] Appl. No.: 08/892,813

[22] Filed: Jul. 15, 1997

[30] Foreign Application Priority Data

Jul. 15, 1996 [FR] France .................................. 96/08916

[51] Int. Cl.$^6$ ............................... H04K 1/00; H04K 9/00
[52] U.S. Cl. ................................................ 380/20; 380/23
[58] Field of Search ......................................... 380/20, 23

[56] References Cited

U.S. PATENT DOCUMENTS

| | | | |
|---|---|---|---|
| 4,947,428 | 8/1990 | Guillou et al. ............................... | 380/20 |
| 5,117,458 | 5/1992 | Takaragi et al. ............................. | 380/4 |
| 5,272,752 | 12/1993 | Myers et al. ............................... | 380/23 |
| 5,301,233 | 4/1994 | Coutrot et al. ............................. | 380/23 |
| 5,420,866 | 5/1995 | Wasilewski et al. ................. | 370/110.1 |
| 5,521,979 | 5/1996 | Deiss ........................................ | 380/20 |
| 5,615,265 | 3/1997 | Coutrot ..................................... | 380/20 |
| 5,799,081 | 8/1998 | Kim et al. .................................. | 380/5 |
| 5,802,063 | 9/1998 | Deiss ....................................... | 370/476 |
| 5,870,474 | 2/1999 | Wasilewski et al. ..................... | 380/21 |

*Primary Examiner*—Tod R. Swann
*Assistant Examiner*—James W. Myhre
*Attorney, Agent, or Firm*—Frishauf, Holtz, Goodman, Langer & Chick, P.C.

[57] ABSTRACT

A system for diversifying information carried by a network to apparatuses for providing goods or services. The network includes a plurality of platforms each capable of creating messages including diversification data for diversifying the information to be carried. The diversification data is provided by a diversification-data generator in each platform. Each apparatus includes an access control module which stores the diversification data separately for each platform.

7 Claims, 2 Drawing Sheets

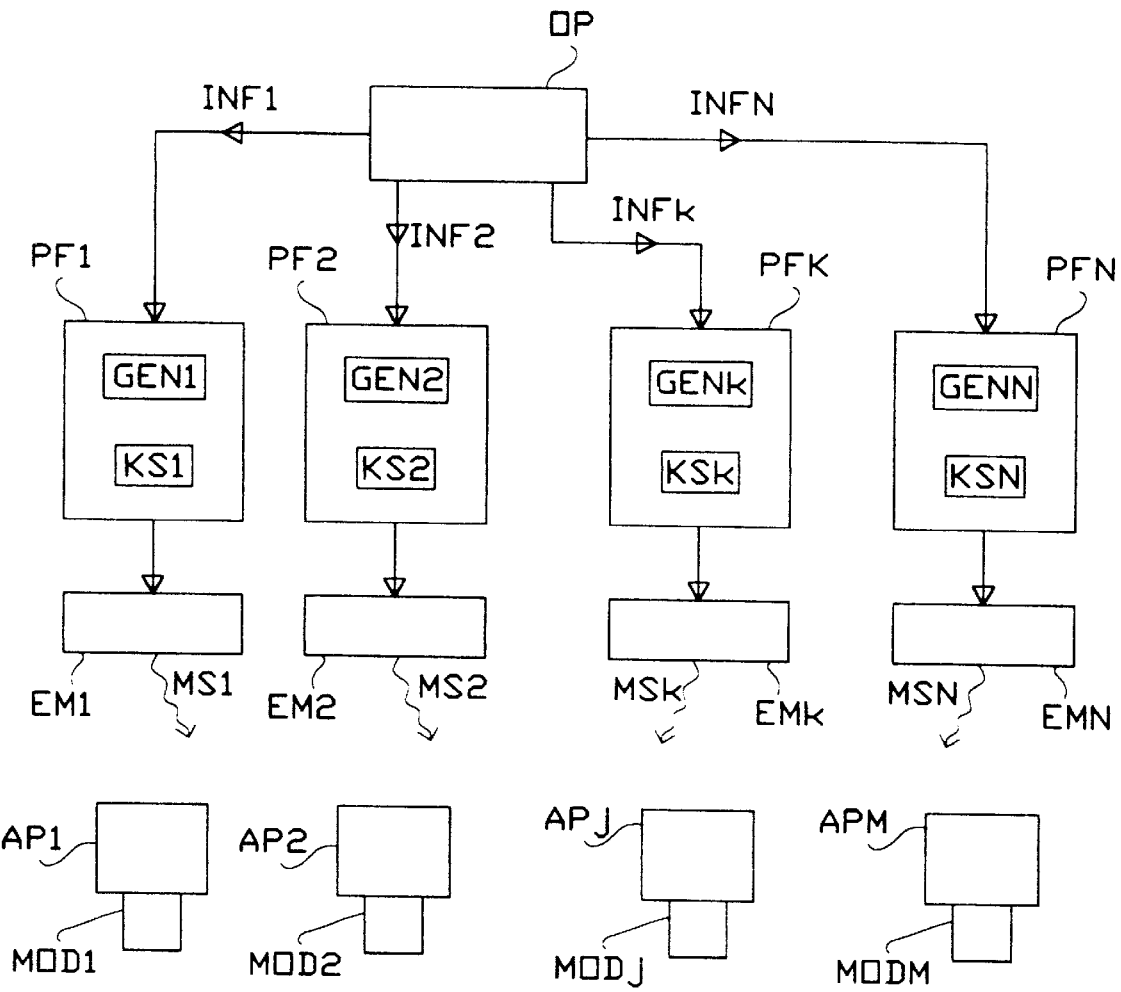
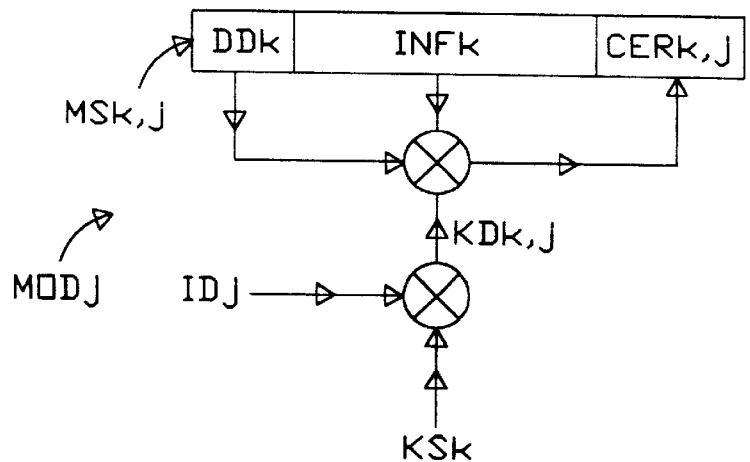
Fig.1
Fig.2

SYSTEM FOR DIVERSIFYING INFORMATION IN A NETWORK FOR DISTRIBUTING GOODS OR SERVICES

FIELD OF THE INVENTION

The present invention relates to a system for diversifying information conveyed by a network to apparatuses that deliver goods or services.

A particularly advantageous application of the invention is in the field of secure electronic transaction systems such as payment systems, mobile-telephone networks, computer networks, pay-television systems, etc.

BACKGROUND OF THE INVENTION

Distribution networks for goods or services comprise one or more platforms, also called network heads, which are essentially computer systems, PC or mainframe computers, responsible for creating messages, at the order of the operator in charge, each message being sent via a transmitter device to the various apparatuses subscribing to the network under consideration.

By way of example, if a user of one of the apparatuses wishes to access a product or a service such as a payment service, a telephone service, access to computer functions (bulletin board or software downloading), or access to encrypted television programs, the messages can include information relating to authorizing such access. Conversely, said platforms can also issue messages for removing previously-granted access rights, or even for modifying such rights, in particular after they have been extended to new products or services offered by the network to its subscribers.

The messages transmitted by the platforms are picked up by a receiver in each apparatus and then forwarded to a security module present in each apparatus. The purpose of the security module is to control access via the corresponding apparatus to the products or services distributed by the network.

The security modules, referred to herein as "access control modules", can be detachable from the apparatus, e.g. an electronic memory card or the like, or non-detachable therefrom, e.g. a security component.

Since the platforms allow the access rights of the apparatuses to the various goods or services of the network to be created, modified, or taken away, the messages issued therefrom must be completely secure.

To this end, in order to prevent any previously-recorded access-authorization message from being reissued to an apparatus by a pirate transmitter after access authorization has been taken away, diversification systems can be used, for example. Similarly, it is necessary to prevent a message intended for one apparatus from being diverted to another apparatus.

A known diversification system includes diversification data contained in each message created by the platforms, which data is combined by means of an encrypting algorithm with a secret key belonging to each platform, thereby enabling a message certificate or signature to be created. In order to prevent a message intended for one apparatus from being diverted to another apparatus, instead of using only the secret key of the platform in order to create the certificate, use is made of a diversified secret key resulting from another encrypting algorithm combining the secret key of the platform with an identification number of the access control module in the apparatus of interest ("destination apparatus").

Since the access control module of the destination apparatus for the message also knows both the secret key of the platform and the encrypting algorithm, it can in turn reconstruct the certificate and compare it with the transmission. If the comparison is positive, it can be concluded that the message was indeed intended for this apparatus and was not being diverted from another apparatus.

In this known diversification system, the diversification data must be a part of each message, and when there are two or more platforms, they must be synchronized, either by being connected to a single diversification-data generator which distributes diversification data on demand from the platforms, or by each having its own generator with reporting to the other generators for each message.

The diversification data can be a random number provided by a random number generator. In that case, and in order to avoid any message duplication, the access control modules must be able to store the random numbers of all of the messages that they receive, in order to be able to verify that a random number received has not been received previously, which would mean that the message has already been received. To do that, it is necessary to reserve a large amount of space in the access control module. For example, with each message having a 4-byte random number, 4000 reserved bytes are required for 1000 messages, that being half the memory space normally available in access control modules.

To remedy that drawback, the diversification data can be the serial number (or identification number) of the transmitted message, which serial number is generated by a message counter that increments by unity with each message transmitted by any of the platforms of the network. It thus suffices for the access control modules to store the number of the last message received and to verify that said number is greater than the previously received number.

However, a drawback to that system is that, in the event of unexpected stoppage, it is necessary to restart the counter from number 1, which would lead to any new message being rejected since it would be considered as a prior message and therefore as having already been received. In that case, a safeguard means would be for each access control module to store the numbers of all the messages received, but the problem thus arises of the cost of the safeguard.

OBJECT AND BRIEF SUMMARY OF THE INVENTION

Thus, one object of the present invention is to eliminate the constraints associated with synchronizing platforms in a system for diversifying information carried by a network to apparatuses that deliver goods or services, said network including a plurality of platforms each capable of creating messages including diversification data for diversifying the information to be carried, said diversification data being provided by respective diversification-data generators, and each apparatus including a respective access control module.

This and other objects are obtained in accordance with one aspect of the present invention in that each platform has an autonomous diversification-data generator, and in that said access control module of each apparatus includes, firstly, storage means for storing the diversification data conveyed with the last message issued by each platform, and secondly, comparison means for comparing each new value of the diversification data received from each platform with the previous value, at least.

Thus, each of the access control modules of the network has as many storage means as the network has platforms, each storage means being assigned to the diversification-data generator of a respective platform.

Because the diversification-data generators are autonomous, the platforms no longer need to be synchronized, thereby greatly simplifying the network, and the small increase in the number of storage means in the access control modules is not a severe penalty.

Another object of the present invention is to enable the platforms to become operational again after failure, while still maintaining maximum security.

To this end, according to the invention, said diversification-data generator is a universal time base, said diversification data being, for example, the transmission time (as defined by day, hour, minute and/or second, for example) of the message relative to a known arbitrary origin $t_0$.

In the event of a platform breaking down (assuming the origin $t_0$ is not lost) the system can restart at a time which is later than the time of the last message provided by said platform. Thus, no special safeguard needs to be envisaged.

A further object of the present invention is to reduce the size of the storage means in the access control modules.

This object is attained in that the invention provides for said time base to have a duration $t_{max}$ limited to not less than the lifetime of said access control modules. In other words, instead of sizing the storage means in terms of the lifetime of the network, e.g. 40 years, they are sized for a lifetime that is only slightly greater than the lifetime of the modules, e.g. 10 years.

However, a problem arises for modules which are put into operation a short time before tmax has elapsed since, theoretically, they will no longer be able to accept messages after said time, the time base being reset to zero and any new messages thus presenting an apparently earlier date.

In order to solve this difficulty, the invention provides discrimination means with each access control module storing in memory the transmission time $t_1$ of the first message provided by each platform, and in that validation of a message transmitted at a time $t_{n+1}$ is performed by comparing the transmission time $t_1$ with the transmission time $t_n$ of the previous message:

if $t_n > t_1$ the message at $t_{n+1}$ is validated if $t_{n+1}$ is not included within the range of $t_1$ to $t_n$, exclusive if $t_n < t_1$ the message at $t_{n+1}$ is validated if $t_{n+1}$ is included within the range of $t_n$ to $t_1$ exclusive.

In this way, the access control modules can be used during the entire duration $t_{max}$, whatever the date on which they are put into operation.

BRIEF DESCRIPTION OF THE DRAWINGS

The invention and implementation thereof will be well understood from the following description, given by way of non-limiting example and with reference to the accompanying drawings.

FIG. 1 is a diagrammatic view of a distribution network for goods and services provided with a system for diversifying information.

FIG. 2 is a diagram showing how a message provided by the platforms of the network of FIG. 1 is created.

DETAILED DESCRIPTION OF THE INVENTION

FIG. 1 shows a distribution network for goods and services which comprises a plurality, N, of platforms PF1, PF2, ..., PFk, ..., PFN capable of responding to instructions INF1, INF2, INFk ... INFN from the network operator OP by creating messages MS1, MS2, ..., MSk, ..., MSN intended for a plurality, M, of apparatuses AP1, AP2, ..., APj, ..., APM subscribing to the network, such as mobile telephones for example. Said messages MSk are conveyed to the various apparatuses by transmitter devices EM1, EM2, ..., EMk, ..., EMN each associated with a respective platform.

Messages MSk are received by apparatuses APj and conveyed to access control modules MODj with which said apparatuses are respectively equipped. Before the apparatuses APj take account of the information contained in messages MSk, the access control modules MODj are responsible for authenticating and validating the messages received, e.g. access authorization or even modification or removal of previously-granted access rights.

FIG. 2 shows the typical structure of a message MSk intended for an apparatus APj. A particular message, referenced here as MSk,j includes the information INFk to be conveyed to apparatus APj. It also includes diversification data DDk provided by an autonomous diversification-data generator GENk, belonging to platform PFk. Each platform PFk is also given its own secret key KSk. Each access control module MODj is assigned an identification code IDj, and the entire set of identification codes is known to each platform. Thus, when a platform PFk needs to provide a message MSk,j for apparatus APj, a diversified secret key KDk,j is built up from the secret key KSk, the information INFk, and the identification code IDj by an encrypting algorithm which can be of the DES type or more simply an exclusive-OR. The diversified secret key KDk,j is combined with the diversification data DDk by means of another encrypting algorithm, DES for example, to constitute a certificate CERk,j.

By diversifying the secret key relative to the destination module MODj, the diversification system is able to prevent a message addressed to one apparatus from being used for another.

Figure 3:
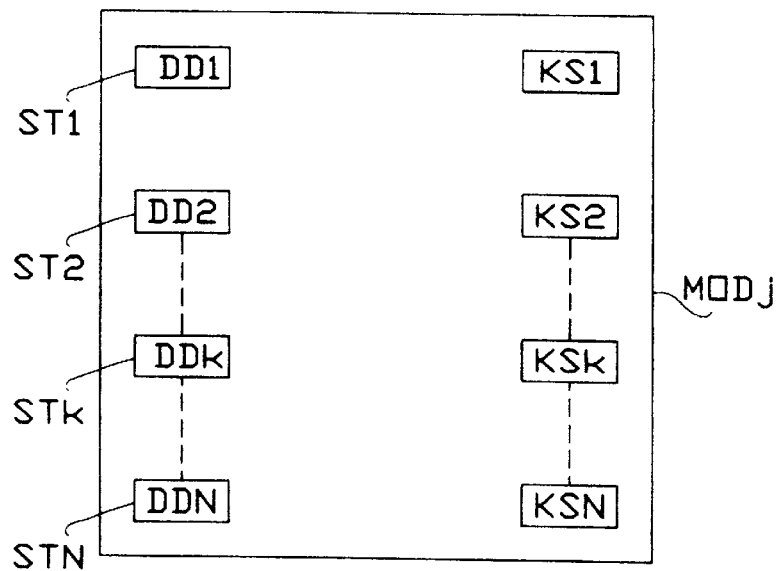
FIG. 3 is a diagram giving the structure of the access control modules of the apparatuses of the network of FIG. 1.

As can be seen in FIG. 3, module MODj of apparatus APj has the secret keys KSk of each platform PFk stored in memory. On receiving the message, it can in turn compute a certificate in the same way as platform PFk and verify the authenticity of message MSk,j by comparing the certificate thus computed with the certificate CERk,j appearing in said message.

As a way of eliminating any need for synchronization between platforms PFk to prevent the various platforms from sending messages MSk having the same diversification data DDk, and as shown in FIG. 3, the access control modules MODj include means STk for storing the value of the diversification data DDk conveyed with the last message MSk provided by each platform PFk. Since the diversification data is stored separately for each platform, there is no longer any danger of collision and therefore no longer any need for synchronizing the platforms with one another. They thus become autonomous. In addition, each module MODj is provided with means for comparing each new value of the diversification data DDk received from each platform PFk with the previous value, at least, so as to prevent a message that has already been sent, and in particular an access authorization, from being stored and resent to the apparatus in fraudulent manner after access authorization has been taken away by the operator OP.

As mentioned above, the diversification data DDk can be random numbers provided by a random number generator GENk. However, in order to avoid any repetition, it is necessary to store all the random numbers received via each platform in the access control module.

In this case, any new random number received is compared with all those already received from the same platform.

The identification number of the messages received from each platform PFk, which increments by unity for each new message, can also be used for diversification data. The diversification-data generator GENk is thus merely a counter. In each module MODj, the storage means STk record the number DDk of the last message transmitted by the platform PFk. For the following message issued from the same platform PFk, the access control module verifies that the number DDk+1 of the new message is indeed subsequent to DDk, in which case the message can be validated. Said diversification system has the advantage of requiring only a single data item to be stored in said storage means.

Figure 4:
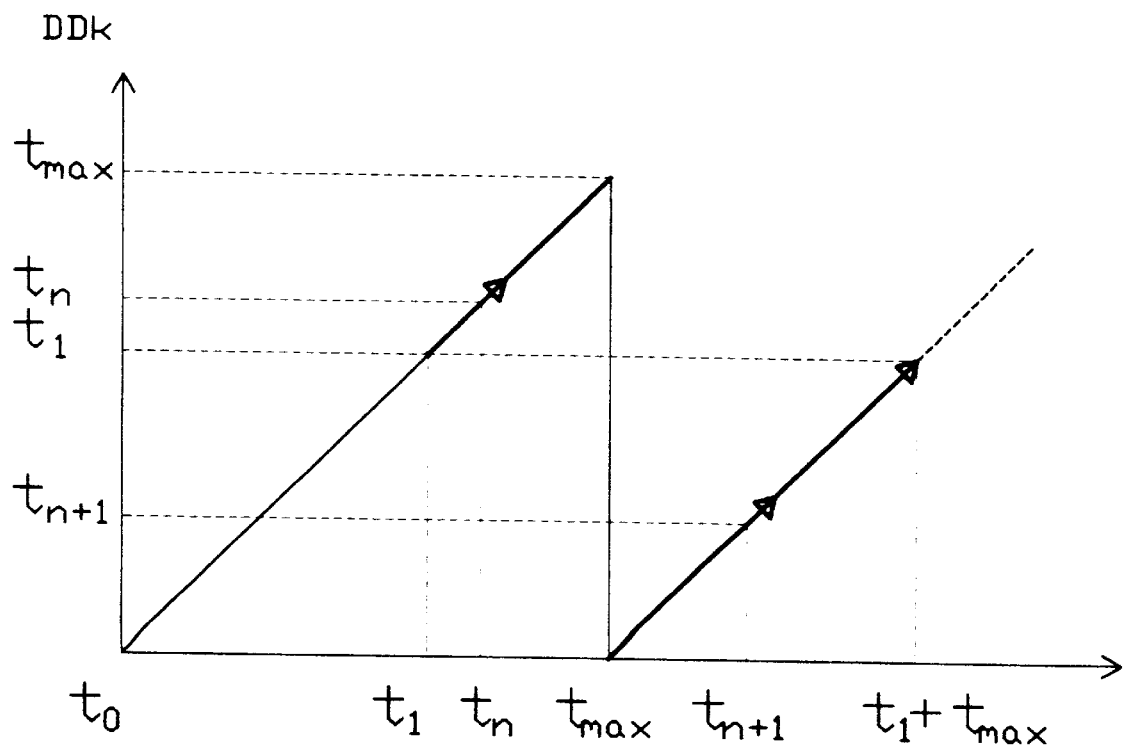
FIG. 4 is a timing diagram of a time base used as a generator for generating diversification data for the platforms of FIG. 1.

The invention also proposes another type of diversification-data generator, the principle of which is shown in FIG. 4.

It relates to a generator constituted by a universal time base (such as Greenwich time) for which the diversification data DDk is the transmission time $t_k$ of the message, said time being taken relative to a known arbitrary origin $t_0$. In the event of the platform stopping unexpectedly, it is able to restart operating automatically since $t_0$ is not lost. Thus, no special safeguard has to be provided.

In order to limit the size of the storage means STk, the time base can, instead of being given a duration $t_{max}$ equal to the lifetime of the network, e.g. 40 years, be limited to a duration slightly longer than the average lifetime of the access control modules MODj. In this case, the diversification data DDk of platform PFk returns to zero after having reached $t_{max}$.

It is thus understood that, without special precautions, the access control modules would reject any messages received after the date $t_{max}$, whatever the date $t_1$ at which the module was put into operation, since the diversification data DDk is apparently lower than the previous data. This means that modules which have been manufactured and stored long after the date $t_0$ have a considerably shortened working lifetime.

This is why discrimination means are provided which allow that drawback to be avoided. These means consist in that each module MODj stores in memory the transmission date $t_1$ of the first message MS1 provided by each platform, the validation of a message transmitted at a date $t_{n+1}$ being performed by comparing the transmission date t1 with the transmission date $t_n$ of the previous message in the following way:

if $t_n > t_1$ the message at $t_{n+1}$ is validated if $t_{n+1}$ is not included within the range $t_1$ to $t_n$, exclusive if $t_n < t_1$ the message at $t_{n+1}$ is validated if $t_{n+1}$ is included within the range of $t_n$ to $t_1$, exclusive.

As shown in FIG. 4, the lifetime of the modules can thus be extended beyond $t_{max}$, to $t_{max}+t_1$, thereby providing a full working duration of $t_{max}$.

We claim:

1. A system for diversifying information carried by a network to apparatuses that provide goods or services, said network including a plurality of platforms each capable of creating messages including diversification data for diversifying the information to be carried, said diversification data being provided by respective diversification-data generators, and each apparatus including an access control module, wherein each platform has an autonomous diversification-data generator, and said access control module of each apparatus includes, storage means for storing the value of the diversification data conveyed with the last message issued by each platform, and comparison means for comparing each new value of the diversification data received from each platform with at least the previous value received from such platform.

2. A diversification system according to claim 1, wherein said diversification-data generator is a random-number generator.

3. A diversification system according to claim 1, wherein said diversification-data generator is a message counter.

4. A diversification system according to claim 1, wherein said diversification-data generator is a universal time base.

5. A diversification system according to claim 4, wherein the diversification data is the transmission date $t_n$ of the message relative to a known arbitrary origin $t_0$.

6. A diversification system according to claim 4, wherein said time base has a duration $t_{max}$ limited to at least the lifetime of said access control modules.

7. A diversification system according to claim 6, wherein each access control module stores in memory the transmission date $t_1$ of the first message provided by each platform, and wherein a message transmitted at a date $t_{n+1}$ is validated by comparing the transmission date $t_1$ with the transmission date $t_n$ of the previous message:

if $t_n > t_1$ the message at $t_{n+1}$ is validated if $t_{n+1}$ is not included within the range $t_1$ to $t_n$, exclusive if $t_n < t_1$ the message at $t_{n+1}$ is validated if $t_{n+1}$ is included within the range $t_n$ to $t_1$, exclusive.

* * * * *

UNITED STATES PATENT AND TRADEMARK OFFICE
CERTIFICATE OF CORRECTION

PATENT NO.    : 5,991,404
DATED         : November 23, 1999
INVENTOR(S)   : Lionel Brahami et al.

It is certified that error appears in the above-identified patent and that said Letters Patent is hereby corrected as shown below:

Item [75]
Inventors line 2, change "Pierre Poli" to -- Issy Les Moulineaux --;

Item [73]
Assignee, change "Tokyo, Japan" to -- Montrouge Cedex, France --.

Signed and Sealed this

Twenty-first Day of August, 2001

*Attest:*

*Attesting Officer*

NICHOLAS P. GODICI
*Acting Director of the United States Patent and Trademark Office*